(12) United States Patent
Wang et al.

(10) Patent No.: US 11,848,164 B2
(45) Date of Patent: Dec. 19, 2023

(54) HIGHLY-RELIABLE MULTILAYER SOLID ALUMINUM ELECTROLYTIC CAPACITOR AND METHOD FOR PREPARING SAME

(71) Applicant: Fujian Guoguang Xinye Sci-Tec Co., Ltd., Fuzhou (CN)

(72) Inventors: Guoping Wang, Fuzhou (CN); Qiushui Zhang, Fuzhou (CN); Changsai Lai, Fuzhou (CN); Panpan Xie, Fuzhou (CN); Qiaolin Chen, Fuzhou (CN); Xiaohui Lin, Fuzhou (CN)

(73) Assignee: Fujian Guoguang Xinye Sci-Tec Co., Ltd., Fuzhou (CN)

( * ) Notice: Subject to any disclaimer, the term of this patent is extended or adjusted under 35 U.S.C. 154(b) by 0 days.

(21) Appl. No.: 18/180,607

(22) Filed: Mar. 8, 2023

(65) Prior Publication Data
US 2023/0245838 A1 Aug. 3, 2023

Related U.S. Application Data (63) Continuation of application No. PCT/CN2022/120615, filed on Sep. 22, 2022.

(30) Foreign Application Priority Data

Jul. 29, 2022 (CN) .......................... 202210902877.4

(51) Int. Cl.
| | |
|---|---|
| *H01G 9/08* | (2006.01) |
| *H01G 9/15* | (2006.01) |
| *H01G 9/045* | (2006.01) |
| *H01G 9/028* | (2006.01) |
| *H01G 9/10* | (2006.01) |
| *H01G 9/012* | (2006.01) |

(52) U.S. Cl.
CPC ............... *H01G 9/15* (2013.01); *H01G 9/012* (2013.01); *H01G 9/028* (2013.01); *H01G 9/045* (2013.01); *H01G 9/08* (2013.01); *H01G 9/10* (2013.01)

(58) Field of Classification Search
CPC .......... H01G 9/15; H01G 9/045; H01G 9/012; H01G 9/08
See application file for complete search history.

(56) References Cited

U.S. PATENT DOCUMENTS

2003/0039093 A1* 2/2003 Tadanobu ................ H01G 9/26
29/25.03

FOREIGN PATENT DOCUMENTS

| CN | 101329950 A | | 12/2008 | |
|---|---|---|---|---|
| CN | 102129917 A | | 7/2011 | |
| CN | 105340033 A | | 2/2016 | |
| CN | 108780703 A | * | 11/2018 | ............. H01G 9/012 |
| CN | 210039947 U | | 2/2020 | |
| JP | 2005217129 A | * | 8/2005 | ............. H01G 11/22 |
| JP | 2006093371 A | * | 4/2006 | ............. H01G 9/012 |
| JP | 2007214168 A | | 8/2007 | |
| WO | WO-2014174833 A1 | * | 10/2014 | ............. H01G 2/06 |
| WO | 2022044939 A1 | | 3/2022 | |

* cited by examiner

*Primary Examiner* — David M Sinclair (57) ABSTRACT

This application provides a multilayer solid aluminum electrolytic capacitor and a method for preparing the same. The multilayer solid aluminum electrolytic capacitor includes a plurality of cores, a rivet, a case, and a cover plate. The cores are stacked in sequence and fastened in the case through the rivet to form a semi-finished capacitor. The semi-finished capacitor is covered by the cover plate and then sealed to form the solid aluminum electrolytic capacitor.

8 Claims, 8 Drawing Sheets

HIGHLY-RELIABLE MULTILAYER SOLID ALUMINUM ELECTROLYTIC CAPACITOR AND METHOD FOR PREPARING SAME

CROSS-REFERENCE TO RELATED APPLICATIONS

This application is a continuation of International Patent Application No. PCT/CN2022/120615, filed on Sep. 22, 2022, which claims the benefit of priority from Chinese Patent Application No. 202210902877.4, filed on Jul. 29, 2022. The content of the aforementioned application, including any intervening amendments thereto, is incorporated herein by reference in its entirety.

TECHNICAL FIELD

This application relates to solid aluminum electrolytic capacitors, and more particularly to a highly-reliable multilayer solid aluminum electrolytic capacitor and a method for preparing the same.

BACKGROUND

Multilayer solid aluminum electrolytic capacitors employ a conductive polymer material as the solid electrolyte, and have a core package structure formed by lamination of multi-layer cores in parallel and a shape suitable for the surface mounting. Compared with the traditional liquid aluminum electrolytic capacitors, they are superior in terms of size, basic electrical performance, service life, frequency impedance and temperature characteristics, environmental protection and safety.

The existing multilayer solid aluminum electrolytic capacitors are generally prepared through the following steps: dividing a formed foil into an anode zone and a cathode zone with a separator; successively forming a conductive polymer solid electrolyte layer, a conductive carbon paste layer, and a silver paste layer on a surface of the cathode zone to form a capacitor core; stacking multiple capacitor cores in parallel, and connecting the stacked capacitor core structure to an external lead frame to lead out the anode and cathode; encapsulating the stacked capacitor core structure with epoxy resin; and bending the leads exposed outside the resin case to form the external terminals.

Although the above-mentioned resin encapsulation is suitable for low-cost and large-scale automated industrial production, it is non-hermetic, and thus it is easy for moisture, corrosive gases, or liquids to enter the capacitor under harsh conditions such as high temperature and high humidity, resulting in deterioration or even failure of the product. Furthermore, since the organic resin is in direct contact with the cores, it is easy to enter the gap between the cores during injection molding, which will result in extrusion deformation of the cores, causing an increase in the leakage current and equivalent series resistance (ESR), and even delamination and capacitor failure. Moreover, the stress produced by the shrinkage of the resin encapsulation material during curing will also result in performance deterioration or even failures. The above-discussed defects limit the application of conventional resin-encapsulated multilayer solid aluminum electrolytic capacitors, especially in complex environments and those fields with high reliability requirements. Therefore, it is urgently needed to design and develop a highly-reliable multilayer solid aluminum electrolytic capacitor to solve the above problems.

SUMMARY

To overcome the above-mentioned technical problems in the prior art, the present disclosure provides a highly-reliable multilayer solid aluminum electrolytic capacitor and a method for preparing the same.

Technical solutions of this application are described below.

In a first aspect, the disclosure provides a multilayer solid aluminum electrolytic capacitor, comprising:
a plurality of cores;
a rivet;
a case; and
a cover plate;
wherein the plurality of cores are stacked in sequence, and fastened in the case through the rivet to form a semi-finished capacitor; the semi-finished capacitor is covered by the cover plate and sealed to form the multilayer solid aluminum electrolytic capacitor;

each of the plurality of cores has an axially symmetrical I-shaped structure, and comprises an anode part and a cathode part; a rectangular connection part is connected between the anode part and the cathode part; a width of the rectangular connection part is smaller than that of the anode part and the cathode part; upper and lower surfaces and two side surfaces of the rectangular connection part are each coated with an insulating blocking adhesive to form an insulating blocking tape; the anode part is provided with a pair of circular through holes fitting the rivet; the cathode part consists of a formed foil, a conductive polymer layer, a conductive carbon paste layer, and a conductive silver paste layer successively arranged from inside to outside; and the case comprises two first side plates, two second side plates, and a bottom plate; a length of the two first side plates is larger than that of the two second side plates; a square open structure is enclosed by the two first side plates, the two second side plates, and the bottom plate; inner side surfaces of the two first side plates are each provided with one blocking plate, and two blocking plates are arranged symmetrically; the two blocking plates are both connected to the bottom plate; the two blocking plates are configured to divide an inner cavity of the case into an anode chamber and a cathode chamber respectively matching the anode part and the cathode part in shape; an anode electrical connection part and a cathode electrical connection part are penetratingly arranged on the bottom plate; the anode part of each of the plurality cores is electrically connected to the anode electrical connection part through the rivet; and the cathode part of each of the plurality cores is electrically connected to the cathode electrical connection part; and a rectangular metal ring is fixedly arranged on an edge of an opening of the case.

In some embodiments, the rivet comprises a circular rivet head and a cylindrical rivet pin connected with each other; the cylindrical rivet pin matches with each of the pair of circular through holes; a diameter of the circular rivet head is larger than that of the cylindrical rivet pin; and an end of the cylindrical rivet pin away from the circular rivet head is tapered.

In some embodiments, an edge of a side of the cover plate near the case is provided with a protrusion matching with the rectangular metal ring; and the cover plate is fixed through fitting between the protrusion and the rectangular metal ring by welding.

In some embodiments, the anode electrical connection part comprises an anode tongue portion, an anode connection portion, and an anode terminal portion connected vertically in sequence; the anode tongue portion comprises a rectangular portion; a side of the rectangular portion away from the anode connection portion is provided with a pair of cylindrical positioning pins matching with the pair of circular through holes; the rectangular portion is embedded in and flush with an inner surface of the bottom plate; an anode ring protrusion is provided at a middle of the anode connection portion; and the anode terminal portion is embedded in and flush with an outer surface of the bottom plate; and the cathode electrical connection part comprises a cathode tongue portion, a cathode connection portion, and a cathode terminal portion connected vertically in sequence; the cathode tongue portion is rectangular, and is embedded in and flush with the inner surface of the bottom plate; a cathode ring protrusion is provided at a middle of the cathode connection portion; and the cathode terminal portion is embedded in and flush with the outer surface of the bottom plate.

In some embodiments, a length of the rectangular connection part is 10-30% of a total length of each of the plurality of cores.

In some embodiments, a height of each of the two blocking plates is equal to a height of each of the two first side plates; and a width of each of the two blocking plates is 10-30% of a width of the bottom plate.

In some embodiments, the two first side plates, the two second side plates, the bottom plate, and the two blocking plates are all made of alumina ceramic; and the rectangular metal ring is made of a Kovar alloy.

In some embodiments, a portion of each of the anode terminal portion and the cathode terminal portion extending out of the case is coated with a tin coating.

In a second aspect, the disclosure provides a method for preparing the aforementioned multilayer solid aluminum electrolytic capacitor, comprising:

(S1) cutting a formed aluminum foil into a first aluminum foil; wherein the first aluminum foil is I-shaped, and has a rectangular connection part, and an end of the first aluminum foil is provided with a pair of circular through holes;

(S2) applying an insulating blocking adhesive to the rectangular connection part of the first aluminum foil to prepare an insulating blocking tape, so as to obtain a second aluminum foil; wherein the second aluminum foil is divided by the insulating blocking tape into an anode zone and a cathode zone;

(S3) subjecting a dielectric layer on at least one side of the cathode zone of the second aluminum foil to formation to form a third aluminum foil;

(S4) forming a conductive polymer layer on a surface of a cathode zone of the third aluminum foil to form a fourth aluminum foil;

(S5) impregnating a cathode zone of the fourth aluminum foil with conductive colloidal graphite followed by drying to form a conductive carbon paste layer, so as to form a fifth aluminum foil;

(S6) impregnating a cathode zone of the fifth aluminum foil with conductive silver paste followed by drying to form a conductive silver paste layer, so as to obtain a core;

(S7) stacking and fixing a plurality of cores in a case according to a designed number of layers to form a semi-finished capacitor; and (S8) placing the cover plate on the case; and sealedly connecting the cover plate with the case by parallel seam welding to produce the multilayer solid aluminum electrolytic capacitor.

In some embodiments, in step (S7), the plurality of cores are stacked and fixed through steps of:

(S71) applying a conductive silver adhesive to a cathode tongue portion, and bonding the cathode tongue portion with a cathode part of a first core; sleeving a pair of circular through holes on an anode part of the first core on a pair of cylindrical positioning pins of an anode tongue portion;

(S72) repeating step (S71) to complete stacking of the plurality of cores according to the designed number of layers; and bonding cathode parts of the plurality of cores through the conductive silver adhesive followed by curing to lead out a cathode;

(S73) inserting the rivet into a hole of each of the pair of cylindrical positioning pins; and fixing the rivet, the pair of cylindrical positioning pins, and anode parts of the plurality of cores through ultrasonic welding to lead out an anode; and (S74) filling an anode cavity of the case with an insulating sealant followed by curing.

Compared with the prior art, this application at least has the following beneficial effects.

(1) In this application, an inorganic encapsulation case is adopted, which is formed by welding a case body with a cover plate. Compared with the traditional resin encapsulation case, the inorganic encapsulation case has higher air tightness, and is more suitable for applications in complex environments and in those fields with high reliability requirements.

(2) In this application, a gap is left between the encapsulation case and the core, preventing the extrusion deformation of the core during the injection molding process and eliminating the stress generated by shrinkage of the plastic encapsulation material during curing. Therefore, the encapsulation process will not cause physical damage to the core, ensuring the performance reliability of the core.

(3) In this application, a ceramic case with an I-shaped inner cavity is adopted to match the I-shaped core. The anode part of the core is led out by a riveting-welding method, and the anode part of the core is filled with an insulating sealant for secondary fixation and protection, which can effectively clamp and fix the core, preventing the delamination caused by poor welding of the anode and enhancing the core-package bonding stability.

BRIEF DESCRIPTION OF THE DRAWINGS

To illustrate the technical solutions in the embodiments of the present disclosure or in the prior art more clearly, the accompanying drawings needed in the description of the embodiments or prior art will be described briefly below. Apparently, presented in the accompanying drawings are only some embodiments of the present disclosure. Other drawings may be obtained by one of ordinary skill in the art without paying any creative effort based on these drawings.

In the drawings: 1, core; 11, anode part; 12, cathode part; 13, rectangular connection part; 14, insulating blocking tape; 15, circular through hole; 2, rivet; 21, circular rivet head; 22, cylindrical rivet pin; 3, case; 31, first side plate; 32, second side plate; 33, bottom plate; 34, blocking plate; 35, anode electrical connection part; 351, anode tongue portion; 3511, rectangular portion; 3512, cylindrical positioning pin; 352, anode connecting portion; 3521, anode ring protrusion; 353, anode terminal portion; 36, cathode electrical connection part; 361, cathode tongue portion; 362, cathode connecting portion; 3621, cathode ring protrusion; 363, cathode terminal portion; 37, rectangular metal ring; 4, cover plate; 41, protrusion; and 5, solid aluminum electrolytic capacitor.

DETAILED DESCRIPTION OF EMBODIMENTS

The technical solutions in the embodiments will be described clearly and completely below with reference to the accompanying drawings. Obviously, described below are merely some embodiments of the present disclosure, which are not intended to limit the present disclosure. Based on the embodiments provided herein, all other embodiments obtained by one of ordinary skill in the art without paying any creative work shall fall within the scope of the present disclosure.

Referring to FIGS. 1-13, this application provides a highly-reliable multilayer solid aluminum electrolytic capacitor, which includes a plurality of cores 1, a rivet 2, a case 3, and a cover plate 4. The plurality of cores 1 are stacked in sequence, and fastened in the case 3 through the rivet 2 to form a semi-finished capacitor. The semi-finished capacitor is covered by the cover plate 4 and sealed to form a multilayer solid aluminum electrolytic capacitor 5.

Figure 1:
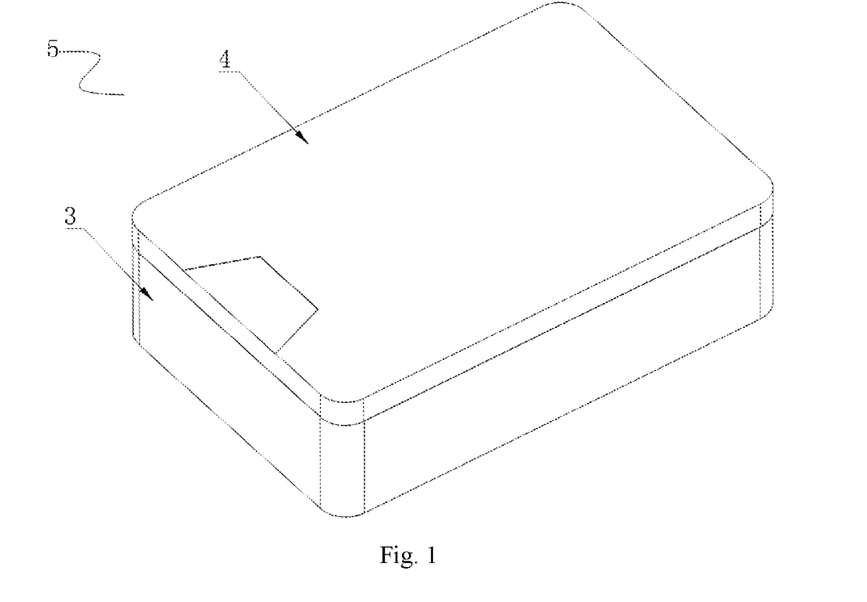
FIG. 1 is a schematic diagram of a solid aluminum electrolytic capacitor according to an embodiment of the present disclosure.
Figure 2:
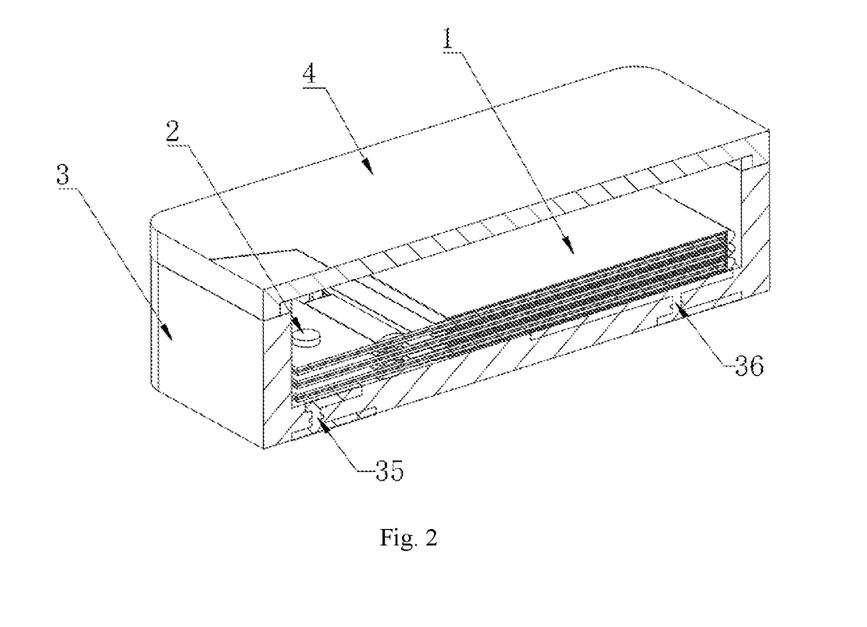
FIG. 2 is a sectional view of the solid aluminum electrolytic capacitor according to an embodiment of the present disclosure.
Figure 3:
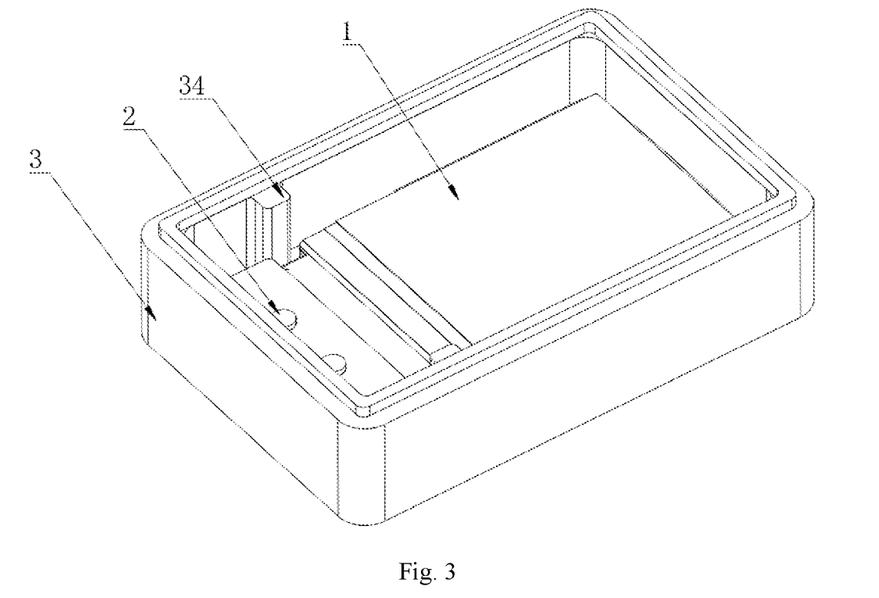
FIG. 3 is a schematic diagram of a semi-finished solid aluminum electrolytic capacitor according to an embodiment of the present disclosure.
Figure 4:
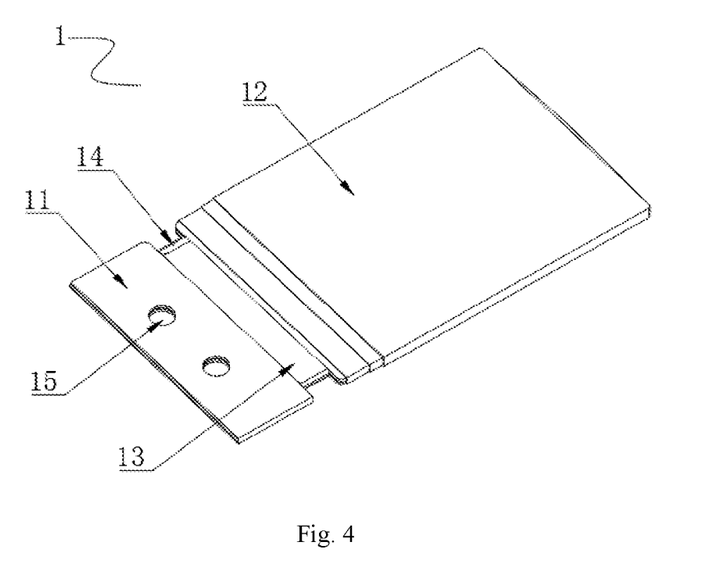
FIG. 4 is a schematic diagram of a core of the solid aluminum electrolytic capacitor according to an embodiment of the present disclosure.

Each of the plurality of cores 1 has an axially symmetrical I-shaped structure, and includes an anode part 11 and a cathode part 12. A rectangular connection part 13 is connected between the anode part and the cathode part 12. A width of the rectangular connection part 13 is smaller than that of the anode part 11 and the cathode part 12. Upper and lower surfaces and two side surfaces of the rectangular connection part 13 is coated with an insulating blocking adhesive to form an insulating blocking tape 14. The anode part 11 is provided with two circular through-holes 15 fitting the rivet 2. The cathode part 12 consists of a formed foil, a conductive polymer layer, a conductive carbon paste layer, and a conductive silver paste layer successively arranged from inside to outside.

Figure 6:
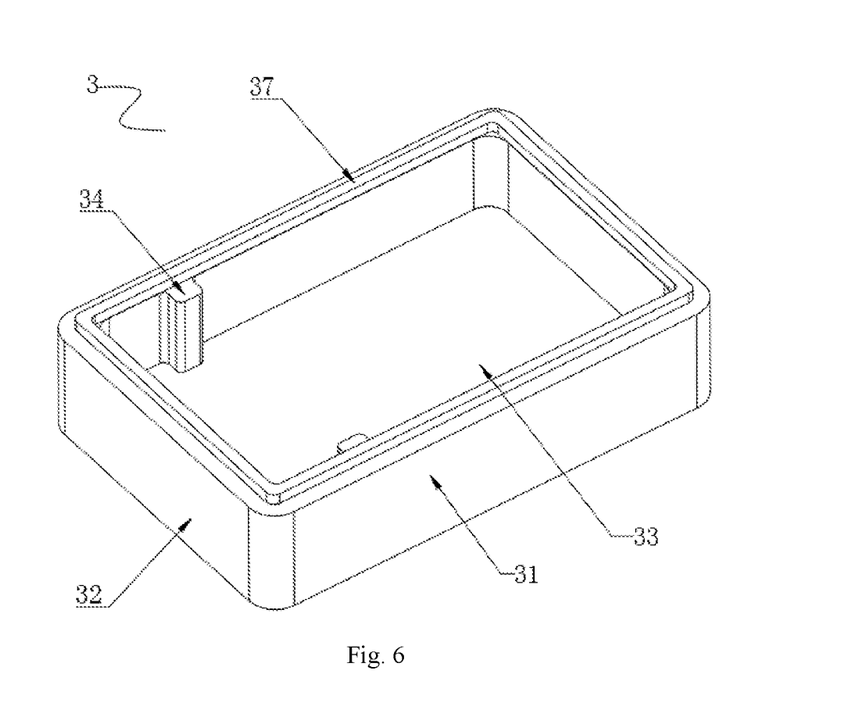
FIG. 6 is a schematic diagram of a case of the solid aluminum electrolytic capacitor according to an embodiment of the present disclosure.

The case 3 includes two first side plates 31, two second side plates 32, and a bottom plate 33. A length of the two first side plates 31 is larger than that of the two second side plates 32. A square open structure is enclosed by the two first side plates 31, the two second side plates 32, and the bottom plate 33. Inner side surface of the two first side plates 31 are each provided with one blocking plates 34, and two blocking plates 34 are arranged symmetrically. The two blocking plates 34 are connected to the bottom plate 33. The two blocking plates 34 are configured to divide an inner cavity of the case 3 into an anode chamber and a cathode chamber matching of the core 1 in shape. An anode electrical connection part 35 and a cathode electrical connection part 36 are penetratingly arranged on the bottom plate 33. The anode part 11 of the core 1 is electrically connected to the anode electrical connection part 35 through the rivet 2, and the cathode part 12 of the core 1 is electrically connected to the cathode electrical connection part 36. A rectangular metal ring 37 is fixedly arranged on an edge of an opening of the case 3.

Figure 5:
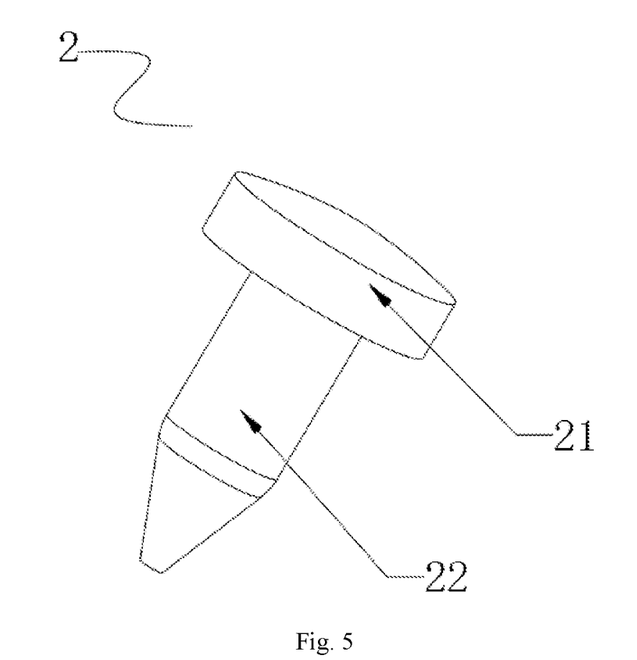
FIG. 5 is a schematic diagram of a rivet of the solid aluminum electrolytic capacitor according to an embodiment of the present disclosure.

Specifically, the rivet 2 includes a circular rivet head 21 and a cylindrical rivet pin 22 connected with each other, and the cylindrical rivet pin 22 matches with the circular through hole 15. The diameter of the circular rivet head 21 is larger than the diameter of the cylindrical rivet pin 22, and the end of the cylindrical rivet pin 22 away from the circular rivet head 21 is tapered.

Figure 7:
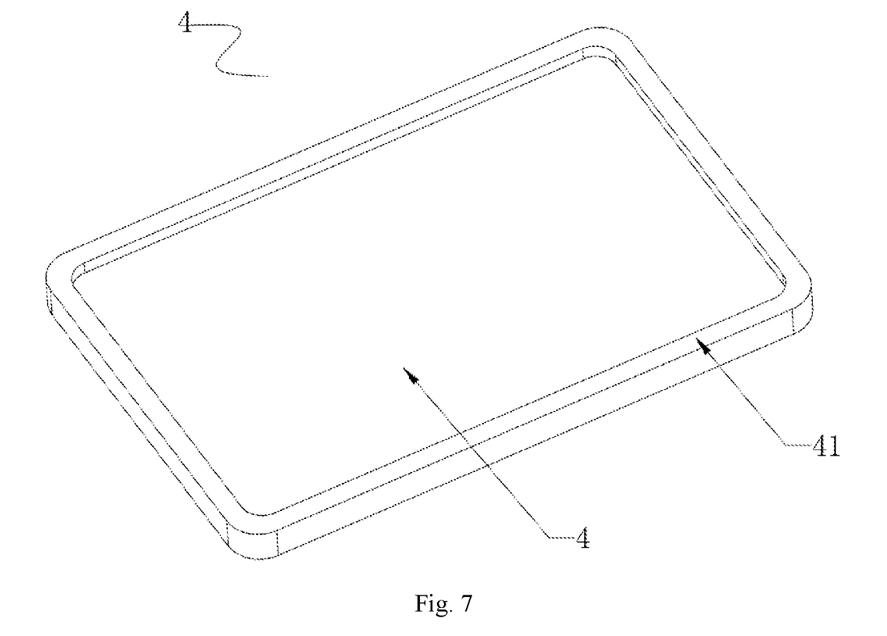
FIG. 7 is a schematic diagram of a cover plate of the solid aluminum electrolytic capacitor according to an embodiment of the present disclosure.

Specifically, the edge of one side of the cover plate 4 near the case 3 is provided with a protrusion 41 matching with the rectangular metal ring 37, and the cover plate 4 is fixed through fitting between the protrusion 41 and the rectangular metal ring 37 by welding.

Figure 8:
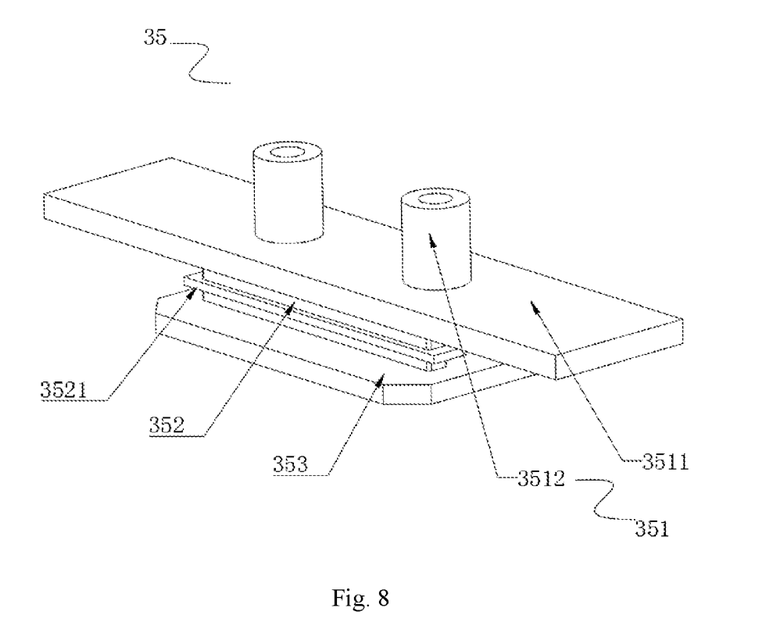
FIG. 8 is a schematic diagram of an anode electrical connection part of the solid aluminum electrolytic capacitor according to an embodiment of the present disclosure.
Figure 9:
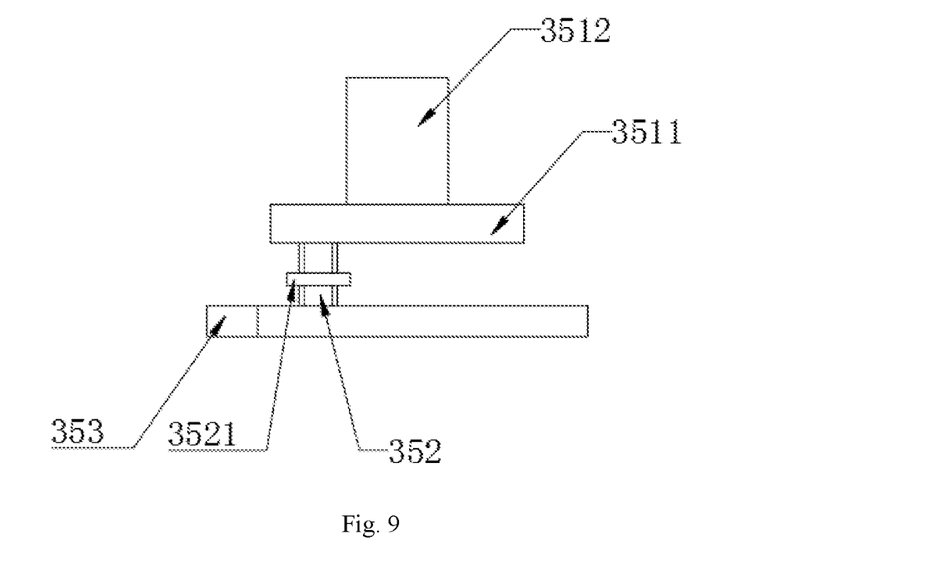
FIG. 9 is a side view of the anode electrical connection part of the solid aluminum electrolytic capacitor according to an embodiment of the present disclosure.

Specifically, the anode electrical connection part 35 includes an anode tongue portion 351, an anode connection portion 352, and an anode terminal portion 353 connected vertically in sequence. The anode tongue portion comprises a rectangular portion. A side of the rectangular portion 3511 away from the anode connection portion 352 is provided with a pair of cylindrical positioning pins 3512 matching with the pair of circular through holes 15. The rectangular portion 3511 is embedded in and flush with an inner surface of the bottom plate 33. An anode ring protrusion 3521 is provided at a middle of the anode connection portion 352. The anode terminal portion 353 is embedded in and flush with the outer surface of the bottom plate 33.

Figure 10:
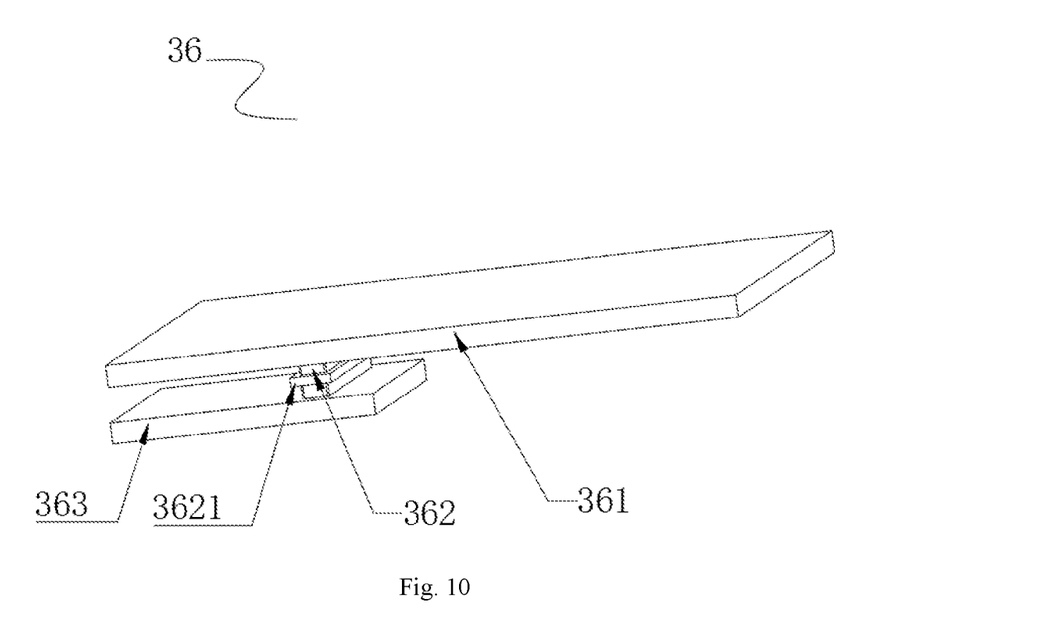
FIG. 10 is a schematic diagram of a cathode electrical connection part of the solid aluminum electrolytic capacitor according to an embodiment of the present disclosure.
Figure 11:
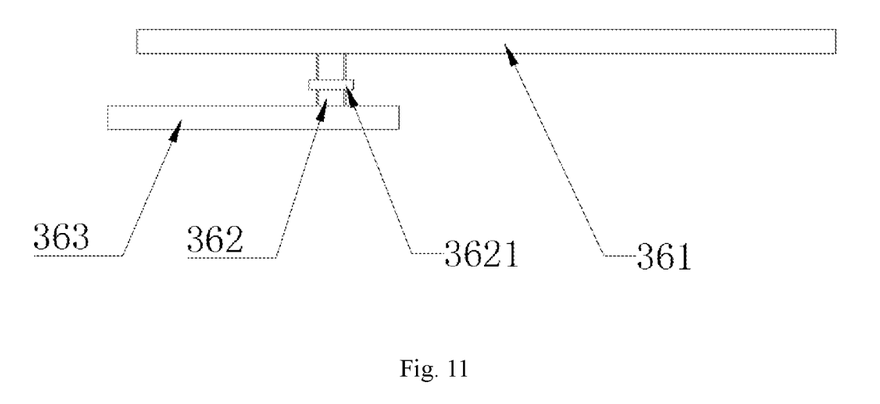
FIG. 11 is a side view of the cathode electrical connection part of the solid aluminum electrolytic capacitor according to an embodiment of the present disclosure.

The cathode electrical connection part 36 includes a cathode tongue portion 361, a cathode connection portion 362, and a cathode terminal portion 363 connected vertically in sequence. The cathode tongue portion 361 is rectangular, and is embedded in and flush with the inner surface of the bottom plate 33. A cathode ring protrusion 3621 is provided at a middle of the cathode connection portion 362. The cathode terminal portion 363 is embedded in and flush with the outer surface of the bottom plate 33.

Specifically, the length of the rectangular connection part 13 is 10-30% of the total length of the core 1.

Specifically, a height of each of the two blocking plates 34 is equal to a height of each of the two first side plates 31, and a width of each of the two blocking plates 34 is 10-30% of the width of the bottom plate 33.

Specifically, the two first side plates 31, the two second side plates 32, the bottom plate 33, and the two blocking plates 34 are all made of alumina ceramic, and the rectangular metal ring 37 is made of a Kovar alloy.

Specifically, a portion of each of the anode terminal portion 353 and the cathode terminal portion 363 extending out of the case 3 is coated with a tin coating.

Figure 12:
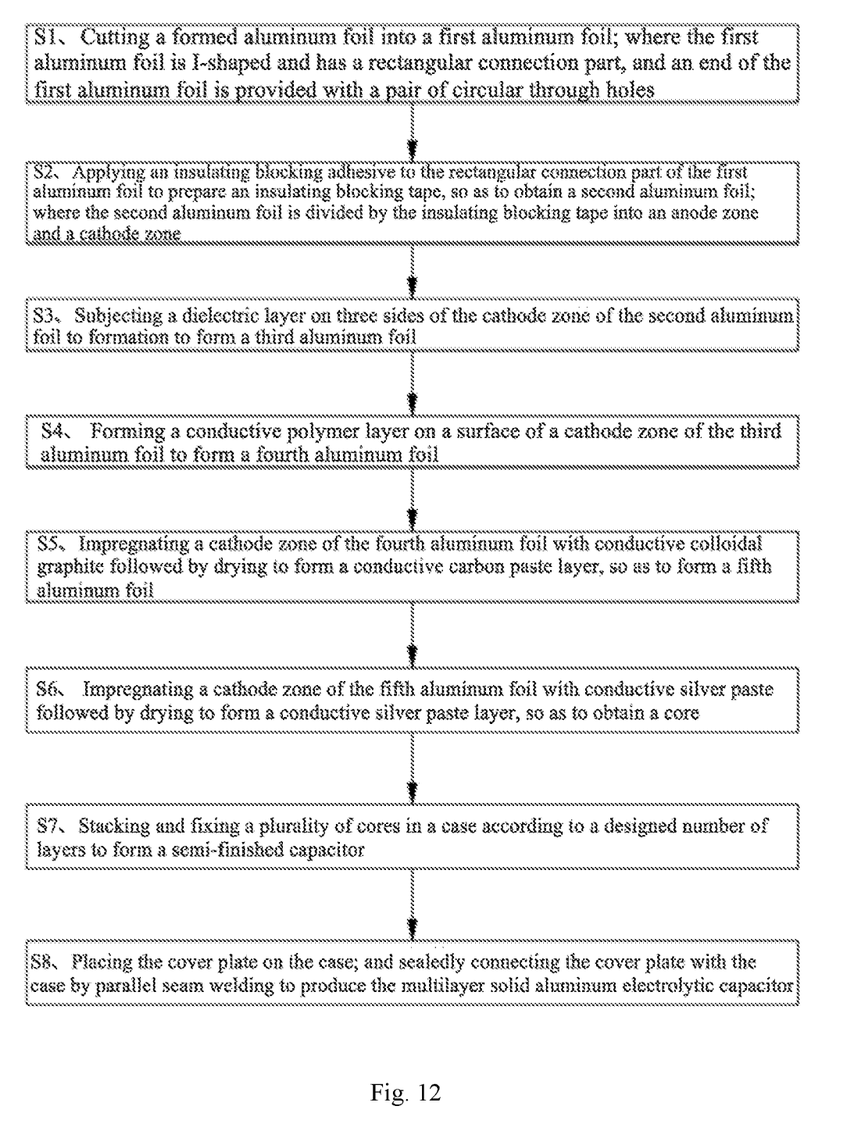
FIG. 12 is a flow chart illustrating a method for preparing the solid aluminum electrolytic capacitor according to an embodiment of the present disclosure.

In a second aspect, this application provides a method for preparing the highly-reliable multilayer solid aluminum electrolytic capacitor, which includes the following steps.

(S1) A formed aluminum foil is cut into a first aluminum foil, where the first aluminum foil is I-shaped and has a rectangular connection part 13, and an end of the first aluminum foil is provided with a pair of circular through holes 15.

(S2) An insulating blocking adhesive is applied to the rectangular connection part 13 of the first aluminum foil to prepare an insulating blocking tape 14, so as to obtain a second aluminum foil, where the second aluminum foil is divided by the insulating blocking tape 14 into an anode zone and a cathode zone.

(S3) A dielectric layer on at least one side of the cathode zone of the second aluminum foil is subjected to formation to form a third aluminum foil.

(S4) A conductive polymer layer is formed on a surface of a cathode zone of the third aluminum foil to form a fourth aluminum foil.

(S5) A cathode zone of the fourth aluminum foil is impregnated with conductive colloidal graphite and dried to form a conductive carbon paste layer, so as to form a fifth aluminum foil.

(S6) A cathode zone of the fifth aluminum foil is impregnated with conductive silver paste and dried to form a conductive silver paste layer, so as to obtain a core 1.

(S7) A plurality of cores 1 are stacked and fixed in a case 3 according to a designed number of layers to form a semi-finished capacitor.

(S8) A cover plate 4 is placed on the case 3 and sealedly connected with the case 3 by parallel seam welding to produce the multilayer solid aluminum electrolytic capacitor 5.

Figure 13:
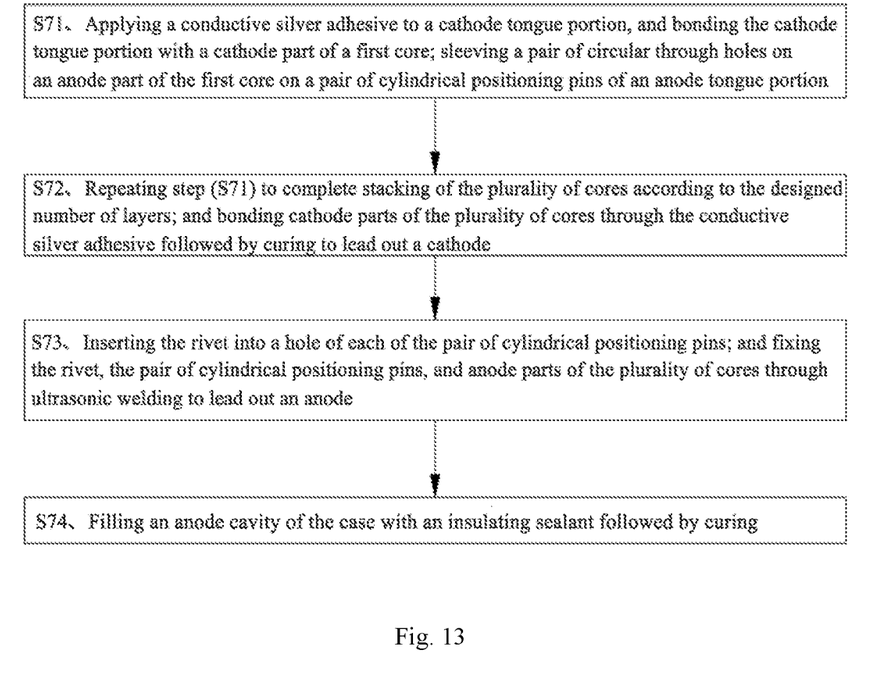
FIG. 13 is a flow chart of step (S7) in the method of preparing the solid aluminum electrolytic capacitor according to an embodiment of the present disclosure.

Specifically, in step (S7), the plurality of cores 1 are stacked and fixed through the following steps.

(S71) A conductive silver adhesive is applied to a cathode tongue portion 361, and the cathode tongue portion 361 is bonded to a cathode part 12 of a first core 1. A pair of circular through holes 15 on an anode part 11 of the first core 1 is sleeved on a pair of cylindrical positioning pins 3512 of an anode tongue portion 351.

(S72) The step (S71) is repeated to complete stacking of the plurality of cores 1 according to the designed number of layers. Cathode parts 12 of the plurality of cores 1 are bonded and cured through the conductive silver adhesive to lead out a cathode.

(S73) The rivet 2 is inserted into a hole of each of the pair of cylindrical positioning pins 3512. The rivet 2, the pair of cylindrical positioning pins 3512, and anode parts 11 of the plurality of cores 1 are fixed through ultrasonic welding to lead out an anode.

(S74) An anode cavity of the case 3 is filled with an insulating sealant and then cured.

EXAMPLE 1

Referring to FIGS. 1-13, an embodiment of the present disclosure provides a method for preparing the highly-reliable multilayer solid aluminum electrolytic capacitor, which includes the following steps.

(S1) A formed aluminum foil (3VF) is cut into an I-shaped first aluminum foil. The first aluminum foil consists of two wider rectangles distributed at the ends and a narrower rectangular connection part 13 in the middle, where an end of the first aluminum foil is provided with a pair of circular through holes 15, and a length of the rectangular connection part 13 is 20% of a total length of the first aluminum foil.

(S2) An insulating blocking adhesive is applied to upper and lower surfaces and two sides of the rectangular connection part 13 of the first aluminum foil to prepare an insulating blocking tape 14, so as to obtain a second aluminum foil, where the second aluminum foil is divided by the insulating blocking tape 14 into an anode zone and a cathode zone. The anode zone (namely, anode part 11) is the end provided with the circular through holes 15 of the first aluminum foil.

(S3) A dielectric layer on three sides of the cathode zone of the second aluminum foil is subjected to formation to form a third aluminum foil.

(S4) A conductive polymer layer is formed on a surface of a cathode zone of the third aluminum foil to form a fourth aluminum foil.

(S5) A cathode zone of the fourth aluminum foil is impregnated with conductive colloidal graphite and dried to form a conductive carbon paste layer, so as to form a fifth aluminum foil.

(S6) A cathode zone of the fifth aluminum foil is impregnated with conductive silver paste and dried to form a conductive silver paste layer, so as to obtain a core 1.

(S7) Four cores 1 are stacked and fixed in a case 3 to form a semi-finished capacitor.

(S8) A cover plate 4 is placed on the case 3 and sealedly connected with the case 3 by parallel seam welding to produce the multilayer solid aluminum electrolytic capacitor 5.

The case 3 includes two first side plates 31, two second side plates 32, and a bottom plate 33. A length of the two first side plates 31 is larger than that of the two second side plates 32. A square open structure is enclosed by the two first side plates 31, the two second side plates 32, and the bottom plate 33. Inner side surface of the two first side plates 31 are each provided with one blocking plates 34, and two blocking plates 34 are arranged symmetrically. The two blocking plates 34 are connected to the bottom plate 33. The first side plate 31, the second side plate 32, the bottom plate 33 and the blocking plate 34 are all made of alumina ceramic. A height of each of the two blocking plates 34 is equal to a height of each of the two first side plates 31, and a width of each of the two blocking plates 34 is 20% of the width of the bottom plate 33. The two blocking plates 34 are configured to divide an inner cavity of the case 3 into an anode chamber and a cathode chamber matching the core 1 in shape. An anode electrical connection part 35 and a cathode electrical connection part 36 are penetratingly arranged on the bottom plate 33. A rectangular metal ring 37 is fixedly arranged on an edge of an opening of the case 3. The rectangular metal ring 37 is made of a Kovar alloy.

The anode electrical connection part 35 includes an anode tongue portion 351, an anode connection portion 352, and an anode terminal portion 353 connected vertically in sequence. The anode tongue portion 351 includes rectangular portion 3511, and a side of the rectangular portion 3511 away from the anode connection portion 352 is provided with a pair of cylindrical positioning pins 3512 matching with the pair of circular through holes 15. The rectangular portion 3511 is embedded in and flush with an inner surface of the bottom plate 33. An anode ring protrusion 3521 is provided at a middle of the anode connection portion 352. The anode terminal portion 353 is embedded in and flush with the outer surface of the bottom plate 33.

The cathode electrical connection part 36 includes a cathode tongue portion 361, a cathode connection portion 362, and a cathode terminal portion 363 connected vertically in sequence. The cathode tongue portion 361 is rectangular, and is embedded in and flush with the inner surface of the bottom plate 33. A cathode ring protrusion 3621 is provided at a middle of the cathode connection portion 362. The cathode terminal portion 363 is embedded in and flush with the outer surface of the bottom plate 33. The anode electrical connection part 35 and the cathode electrical connection part 36 are made of copper or a copper alloy, and the surface of the anode terminal portion 353 and the cathode terminal portion 363 exposed out of the case 3 are also provided with a tin coating.

In this embodiment, a ceramic case with integrated embedded metal pins is adopted, and a protruding structure is provided on the part of the metal pins located inside the ceramic case, which is configured to extend the water vapor path and increase the resistance to moisture.

The four cores 1 are stacked and fixed through the following steps.

(S71) A conductive silver adhesive is applied to the cathode tongue portion 361, and the cathode tongue portion 361 is bonded to a cathode part 12 of a first core 1. A pair of circular through holes 15 on an anode part 11 of the first core 1 is sleeved on a pair of cylindrical positioning pins 3512 of an anode tongue portion 351.

(S72) The step (S71) is repeated to complete stacking of the four cores 1. Cathode parts 12 of the four cores 1 are bonded and cured through the conductive silver adhesive to lead out a cathode.

(S73) The rivet 2 is inserted into a hole of each of the pair of cylindrical positioning pins 3512. The rivets 2, the pair of cylindrical positioning pins 3512, and anode parts 11 of the four cores 1 are fixed through ultrasonic welding to lead out an anode.

The rivet 2 includes a circular rivet head 21 and a cylindrical rivet pin 22 connected to each other, and the cylindrical rivet pin 22 matches with the circular through hole 15. The diameter of the circular rivet head 21 is larger than the diameter of the cylindrical rivet pin 22, and the end of the cylindrical rivet pin 22 away from the circular rivet head 21 is tapered. The tapered end of the rivet 2 is driven into the hole of the cylindrical positioning pin 3512, and the rivet is made of copper or a copper alloy (S74) An anode cavity of the case 3 is filled with an insulating sealant and then cured.

The cover plate 4 is made of a Kovar alloy. The edge of one side of the cover plate 4 near the case 3 is provided with a protrusion 41 matching with the rectangular metal ring 37, and the cover plate 4 is fixed through fitting between the protrusion 41 and the rectangular metal ring 37 by welding.

In this embodiment, an outer surface of the bottom plate 33 is the surface away from the opening direction of the case 3, and the inner surface of the bottom plate 33 is the surface close to the opening direction of the case 3.

Comparative Example

Provided is a method for preparing a solid aluminum electrolytic capacitor, which includes the following steps.

(S1) A formed aluminum foil (3VF) is cut into a long stripe to form a first aluminum foil.

(S2) An insulating blocking adhesive is applied to the first aluminum foil to obtain a second aluminum foil, where the second aluminum foil is divided by the insulating blocking adhesive into an anode zone and a cathode zone. The area of the cathode zone in this embodiment is the same as the area of the cathode zone in Example 1.

(S3) A dielectric layer on three sides of the cathode zone of the second aluminum foil is subjected to formation to form a third aluminum foil.

(S4) A conductive polymer layer is formed on a surface of a cathode zone of the third aluminum foil to form a fourth aluminum foil.

(S5) A cathode zone of the fourth aluminum foil is impregnated with conductive colloidal graphite and dried to form a conductive carbon paste layer, so as to form a fifth aluminum foil.

(S6) A cathode zone of the fifth aluminum foil is impregnated with conductive silver paste and dried to form a conductive silver paste layer, so as to obtain a core.

(S7) Four cores 1 are stacked and fixed on the front and back sides of the external flat lead frame. Specifically, the anode part of the core is electrically connected to the external lead frame by welding, and the cathode part of the core is electrically connected to the external lead frame through a conductive silver glue, so as to form a core package.

(S8) After the core package is encapsulated in epoxy resin and cured, the leads extending out of the resin case are bent to form pins to obtain the solid aluminum electrolytic capacitor.

Electrical performance of 2V330 μF solid aluminum electrolytic capacitors produced in the Example 1 and Comparative Example are tested, and the data are shown in Table 1.

TABLE 1

Electrical performances of solid aluminum electrolytic capacitors in Example 1 and Comparative Example.

| Samples | Leakage current (μA) | Equivalent series resistance (ESR) (mΩ) | Capacitance change rate after steady-state damp heat test (85° C./85% RH, 500 h) | Leakage current after steady-state damp heat test (85° C./85% RH, 500 h) (μA) |
|---|---|---|---|---|
| Example 1 | 10.1 | 5 | 11.6% | 87 |
| Comparative Example | 26.4 | 9 | 43.3% | 394 |

The core of this application is to adopt an I-shaped capacitor core. The I-shaped capacitor core is assembled into a ceramic case provided with an I-shaped inner cavity and integrated embedded pins, and then sealedly connected with a cover plate to produce a highly-reliable and surface-mountable multilayer solid aluminum electrolytic capacitor, which is different from the common multilayer solid aluminum electrolytic capacitor. Specifically, the common multilayer solid aluminum electrolytic capacitor is encapsulated with organic materials, and the encapsulation material directly touches the core. On the contrary, the multilayer solid aluminum electrolytic capacitor provided herein is hermetically encapsulated with inorganic materials by using a ceramic case and a cover plate, and a gap exists between the ceramic case and the core.

Moreover, the common multilayer solid aluminum electrolytic capacitor uses an external lead frame (lead wire) to stack the cores on the anode and cathode tongues of the lead frame piece by piece, so as to lead out the anode and cathode, where the external terminals are formed by bending the leads exposed on the outside of the resin encapsulated case to the outer surface of the product. In contrast, in this application, lead components are pre-integrated in the encapsulated case to replace the pin forming process after encapsulation.

As can be seen from the electrical performance data, compared with the comparative example, the multilayer solid aluminum electrolytic capacitor produced in Example 1 has lower leakage current, lower ESR, better air tightness and better moisture resistance.

It should be understood that as used herein, the terms, such as "coaxial", "bottom", "end", "top", "middle", "other end", "upper", "side", "top", "inside", "front", "top", "inside", "front", "center", and "two ends" are used to illustrate orientation or positional relationships in the accompanying drawings, and are merely intended to facilitate and simplify the description of this application, but not indicate or imply that the device or element referred to must have a particular orientation or be constructed and operate in a particular orientation. Therefore, these terms should not be considered as limitations for the present disclosure.

Unless otherwise expressly specified and limited, as used herein, the terms "mounting", "setting", "connecting", "fixing", and "screwing" shall be understood in a broad sense. For example, it may refer to a fixed connection, a detachable connection or an integral connection; a mechanical connection or an electrical connection; a direct connection or an indirect connection through an intermediate medium; and communication or interaction between two elements. Unless otherwise expressly limited, the specific meaning of the above terms in the context of the present disclosure can be understood by one of ordinary skill in the art depending on the specific circumstances.

Although the present disclosure has been illustrated and described in detail above, it should be understood that one of ordinary skill in the art can still make various variations, changes, modifications and replacements to the embodiments disclosed herein. It should be noted that those variations, changes, modifications and replacements made without departing from the principle and spirit of the present disclosure shall still fall within the scope of the present disclosure defined by the appended claims.

What is claimed is:

1. A multilayer solid aluminum electrolytic capacitor, comprising:
    a plurality of cores;
    a plurality of rivets;
    a case; and
    a cover plate;
    wherein the plurality of cores are stacked in sequence, and fastened in the case through the plurality of rivets to form a semi-finished capacitor; the semi-finished capacitor is covered by the cover plate and sealed to form the multilayer solid aluminum electrolytic capacitor;
    each of the plurality of cores has an axially symmetrical I-shaped structure, and comprises an anode part and a cathode part; a rectangular connection part is connected between the anode part and the cathode part; a width of the rectangular connection part is smaller than that of the anode part and the cathode part; upper and lower surfaces and two side surfaces of the rectangular connection part are each coated with an insulating blocking adhesive to form an insulating blocking tape; the anode part is provided with a pair of circular through holes fitting the plurality of rivets; the cathode part consists of a formed foil, a conductive polymer layer, a conductive carbon paste layer, and a conductive silver paste layer successively arranged from inside to outside; and
    the case comprises two first side plates, two second side plates, and a bottom plate; a length of the two first side plates is larger than that of the two second side plates; a square open structure is enclosed by the two first side plates, the two second side plates, and the bottom plate; inner side surfaces of the two first side plates are each provided with one blocking plate, and two blocking plates are arranged symmetrically; the two blocking plates are both connected to the bottom plate; the two blocking plates are configured to divide an inner cavity of the case into an anode chamber and a cathode chamber respectively matching the anode part and the cathode part in shape; an anode electrical connection part and a cathode electrical connection part are penetratingly arranged on the bottom plate; the anode part of each of the plurality cores is electrically connected to the anode electrical connection part through the plurality of rivets; and the cathode part of each of the plurality cores is electrically connected to the cathode electrical connection part; and a rectangular metal ring is fixedly arranged on an edge of an opening of the case.

2. The stacked solid aluminum electrolytic capacitor of claim 1, wherein each of the plurality of rivets comprises a circular rivet head and a cylindrical rivet pin connected with each other; the cylindrical rivet pin matches with each of the pair of circular through holes; a diameter of the circular rivet head is larger than that of the cylindrical rivet pin; and an end of the cylindrical rivet pin away from the circular rivet head is tapered.

3. The stacked solid aluminum electrolytic capacitor of claim 1, wherein an edge of a side of the cover plate near the case is provided with a protrusion matching with the rectangular metal ring; and the cover plate is fixed through fitting between the protrusion and the rectangular metal ring by welding.

4. The stacked solid aluminum electrolytic capacitor of claim 1, wherein the anode electrical connection part comprises an anode tongue portion, an anode connection portion, and an anode terminal portion connected vertically in sequence; the anode tongue portion comprises a rectangular portion; a side of the rectangular portion away from the anode connection portion is provided with a pair of cylindrical positioning pins matching with the pair of circular through holes; the rectangular portion is embedded in and flush with an inner surface of the bottom plate; an anode ring protrusion is provided at a middle of the anode connection portion; and
    the anode terminal portion is embedded in and flush with an outer surface of the bottom plate; and
    the cathode electrical connection part comprises a cathode tongue portion, a cathode connection portion, and a cathode terminal portion connected vertically in sequence; the cathode tongue portion is rectangular, and is embedded in and flush with the inner surface of the bottom plate; a cathode ring protrusion is provided at a middle of the cathode connection portion; and the cathode terminal portion is embedded in and flush with the outer surface of the bottom plate.

5. The stacked solid aluminum electrolytic capacitor of claim 1, wherein a length of the rectangular connection part is 10-30% of a total length of each of the plurality of cores.

6. The stacked solid aluminum electrolytic capacitor of claim 1, wherein a height of each of the two blocking plates is equal to a height of each of the two first side plates; and a width of each of the two blocking plates is 10-30% of a width of the bottom plate.

7. The stacked solid aluminum electrolytic capacitor of claim 1, wherein the two first side plates, the two second side plates, the bottom plate, and the two blocking plates are all made of alumina ceramic; and the rectangular metal ring is made of a Kovar alloy.

8. The stacked solid aluminum electrolytic capacitor of claim 4, wherein a portion of each of the anode terminal portion and the cathode terminal portion extending out of the case is coated with a tin coating.

* * * * *